(12) United States Patent
Kim

(10) Patent No.: US 12,187,283 B2
(45) Date of Patent: Jan. 7, 2025

(54) APPARATUS AND METHOD FOR ASSISTING DRIVING OF VEHICLE

(71) Applicant: HL Klemove Corp., Incheon (KR)

(72) Inventor: Taehan Kim, Anyang-si (KR)

(73) Assignee: HL KLEMOVE CORP., Incheon (KR)

( * ) Notice: Subject to any disclaimer, the term of this patent is extended or adjusted under 35 U.S.C. 154(b) by 216 days.

(21) Appl. No.: 17/730,647

(22) Filed: Apr. 27, 2022

(65) Prior Publication Data

US 2022/0348207 A1    Nov. 3, 2022

(30) Foreign Application Priority Data

Apr. 28, 2021    (KR) .................. 10-2021-0055243

(51) Int. Cl.
| | |
|---|---|
| B60W 30/18 | (2012.01) |
| G06V 20/56 | (2022.01) |
| G06V 20/58 | (2022.01) |

(52) U.S. Cl.
CPC ....... B60W 30/18163 (2013.01); G06V 20/58 (2022.01); G06V 20/588 (2022.01); B60W 2420/403 (2013.01); B60W 2520/10 (2013.01); B60W 2552/05 (2020.02); B60W 2552/10 (2020.02); B60W 2552/53 (2020.02); B60W 2554/20 (2020.02); B60W 2554/4041 (2020.02); B60W 2554/802 (2020.02)

(58) Field of Classification Search
CPC ....... B60W 30/18163; B60W 2554/20; B60W 2554/4041; B60W 2552/53; B60W 2554/802; B60W 2552/05; B60W 2552/10; B60W 2420/403; B60W 2520/10; G06V 20/58; G06V 20/588
See application file for complete search history.

(56) References Cited

U.S. PATENT DOCUMENTS

| | | | | |
|---|---|---|---|---|
| 2010/0121569 | A1* | 5/2010 | Nakamura | G01C 21/3658 |
| | | | | 340/995.14 |
| 2012/0109521 | A1* | 5/2012 | Rothschild | G08G 1/167 |
| | | | | 701/487 |
| 2013/0103304 | A1* | 4/2013 | Nishibashi | G08G 1/096827 |
| | | | | 701/410 |

(Continued)

FOREIGN PATENT DOCUMENTS

| | | |
|---|---|---|
| KR | 10-2018-0023976 A | 3/2018 |
| KR | 10-2019-0007638 A | 1/2019 |

(Continued)

OTHER PUBLICATIONS

KR OA dated Jun. 18, 2024.

*Primary Examiner* — Naeem Taslim Alam
(74) *Attorney, Agent, or Firm* — Harvest IP Law, LLP

(57) ABSTRACT

Disclosed is an apparatus for assisting driving of a vehicle including a camera installed in the vehicle to have a front field of view of the vehicle and obtain image data, and a controller to process the image data. The controller is configured to identify objects surrounding the vehicle and lanes defining a road on which the vehicle travels based on the processing of the image data, identify a lane in which the vehicle travels based on relative positions of the surrounding objects, and control the vehicle to change the lane based on a distance from the road on which the vehicle is traveling to an additional lane for entering an exit road.

16 Claims, 8 Drawing Sheets

(56) References Cited

U.S. PATENT DOCUMENTS

| | | | | |
|---|---|---|---|---|
| 2015/0029042 | A1* | 1/2015 | Ikeya | G01S 7/41 |
| | | | | 340/934 |
| 2016/0363935 | A1* | 12/2016 | Shuster | G08G 1/0141 |
| 2017/0031361 | A1* | 2/2017 | Olson | G06V 20/56 |
| 2017/0043720 | A1* | 2/2017 | Shaw | B60R 1/28 |
| 2017/0060133 | A1* | 3/2017 | Seo | G08G 1/143 |
| 2018/0047288 | A1* | 2/2018 | Cordell | G08G 1/166 |
| 2018/0349741 | A1* | 12/2018 | Yasutomi | G06V 40/103 |
| 2019/0152525 | A1* | 5/2019 | Resch | G01C 21/34 |
| 2019/0204835 | A1* | 7/2019 | Cho | B60R 1/28 |
| 2019/0265700 | A1* | 8/2019 | Honda | B60W 50/14 |
| 2020/0074863 | A1* | 3/2020 | Jung | G08G 1/164 |
| 2020/0086882 | A1* | 3/2020 | Kodali | B60W 40/09 |
| 2020/0184809 | A1* | 6/2020 | Lee | G06F 18/211 |
| 2020/0218913 | A1* | 7/2020 | Unnikrishnan | G01S 13/867 |
| 2020/0377102 | A1* | 12/2020 | Kuwahara | B60W 40/04 |
| 2021/0148725 | A1* | 5/2021 | Watahiki | G09B 29/007 |
| 2021/0163011 | A1* | 6/2021 | Maru | G08G 1/167 |
| 2021/0284162 | A1* | 9/2021 | Parks | G05D 1/0212 |
| 2021/0300376 | A1* | 9/2021 | Hatano | B60W 40/08 |
| 2021/0300377 | A1* | 9/2021 | Kanoh | B60W 30/0956 |
| 2021/0347362 | A1* | 11/2021 | Bowyer | B60W 60/00274 |
| 2021/0380112 | A1* | 12/2021 | Oh | B60W 30/0956 |
| 2022/0065635 | A1* | 3/2022 | Lee | B60W 60/0051 |
| 2022/0163341 | A1* | 5/2022 | Maru | G01C 21/3658 |
| 2022/0223036 | A1* | 7/2022 | Chikamori | G01C 21/3461 |
| 2022/0340166 | A1* | 10/2022 | Kume | B60K 35/29 |
| 2024/0075927 | A1* | 3/2024 | Seccamonte | B60W 30/143 |

FOREIGN PATENT DOCUMENTS

| | | |
|---|---|---|
| KR | 10-2019-0064232 A | 6/2019 |
| KR | 20200133857 A | 12/2020 |

\* cited by examiner

[FIG. 1]
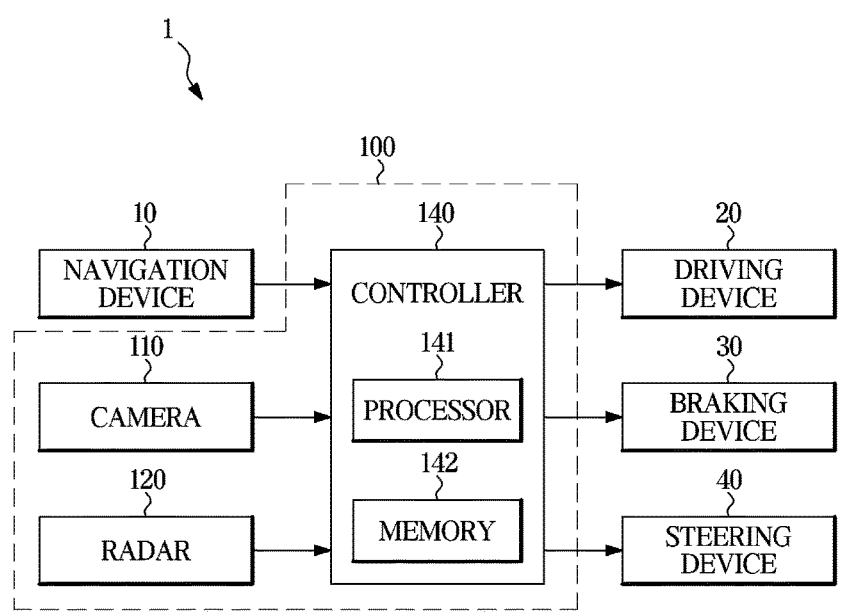

[FIG. 2]
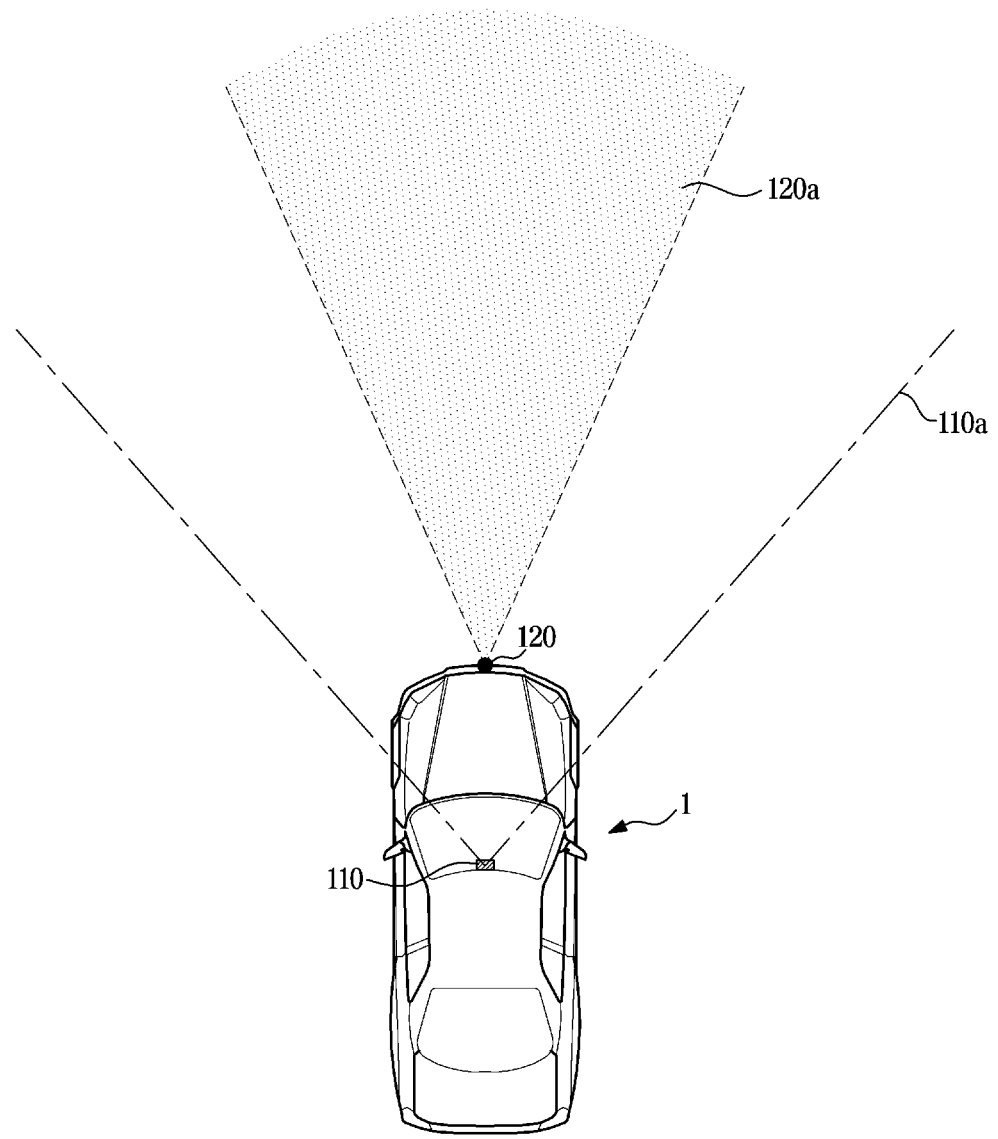

[FIG. 3]
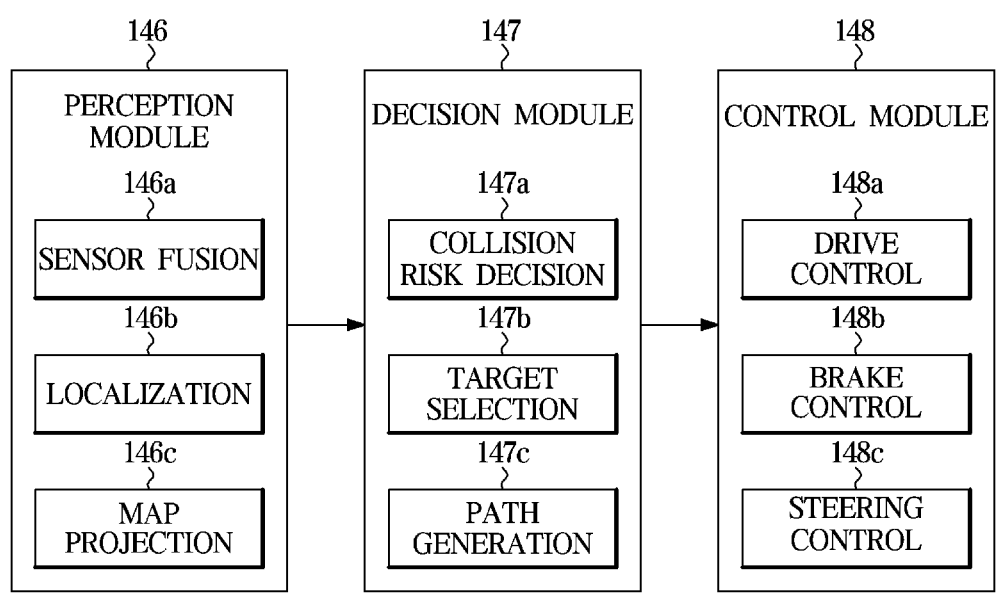

[FIG. 4]
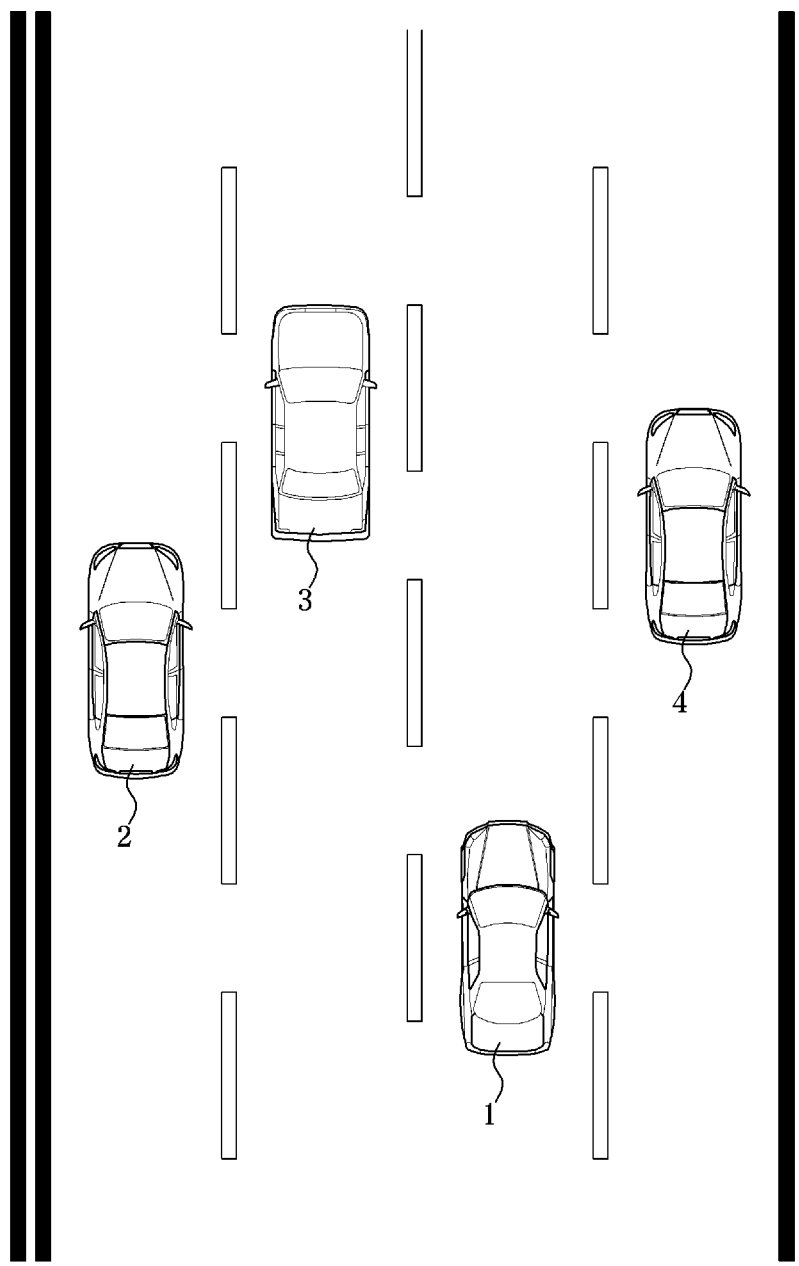

[FIG. 5]
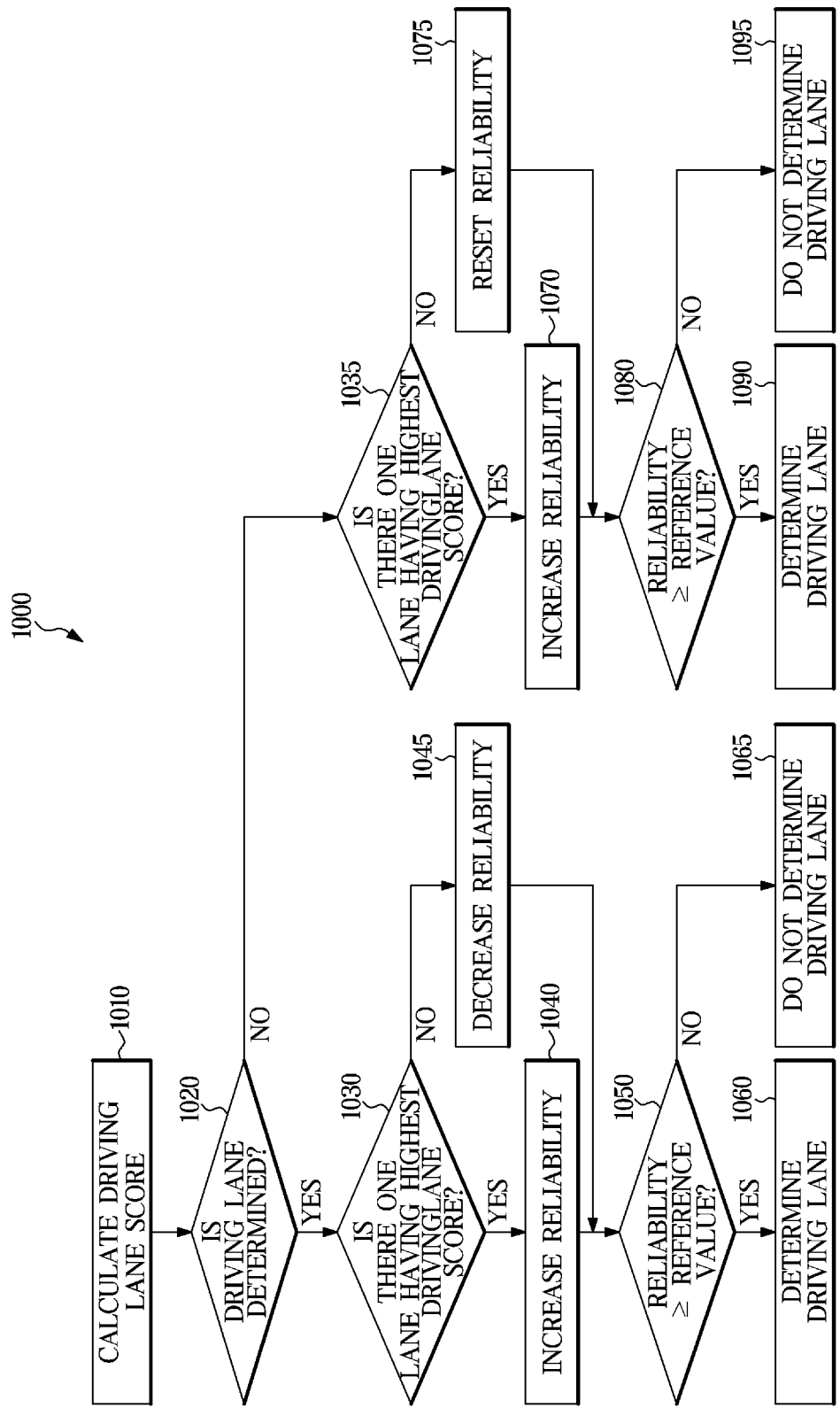

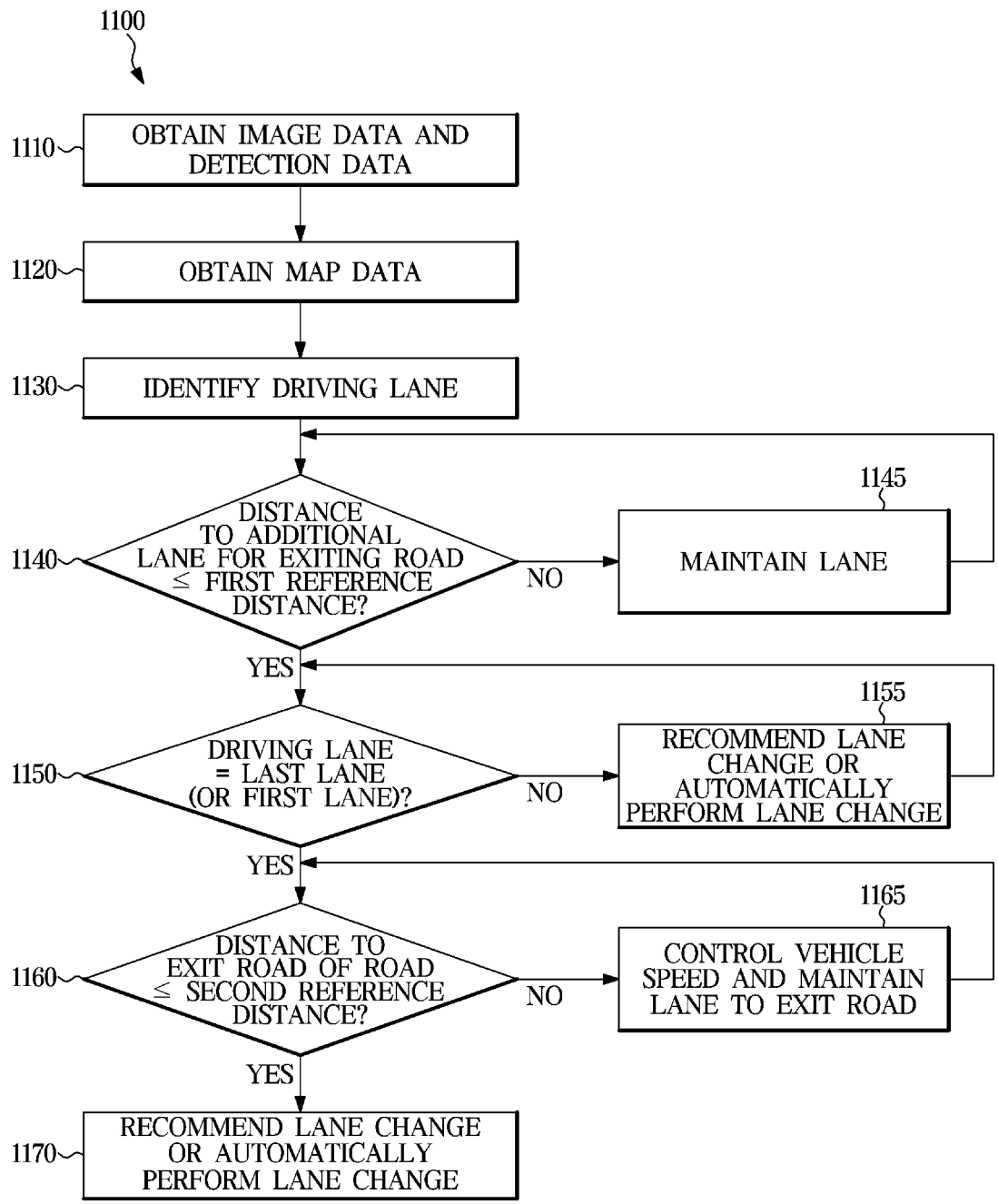

[FIG. 7]
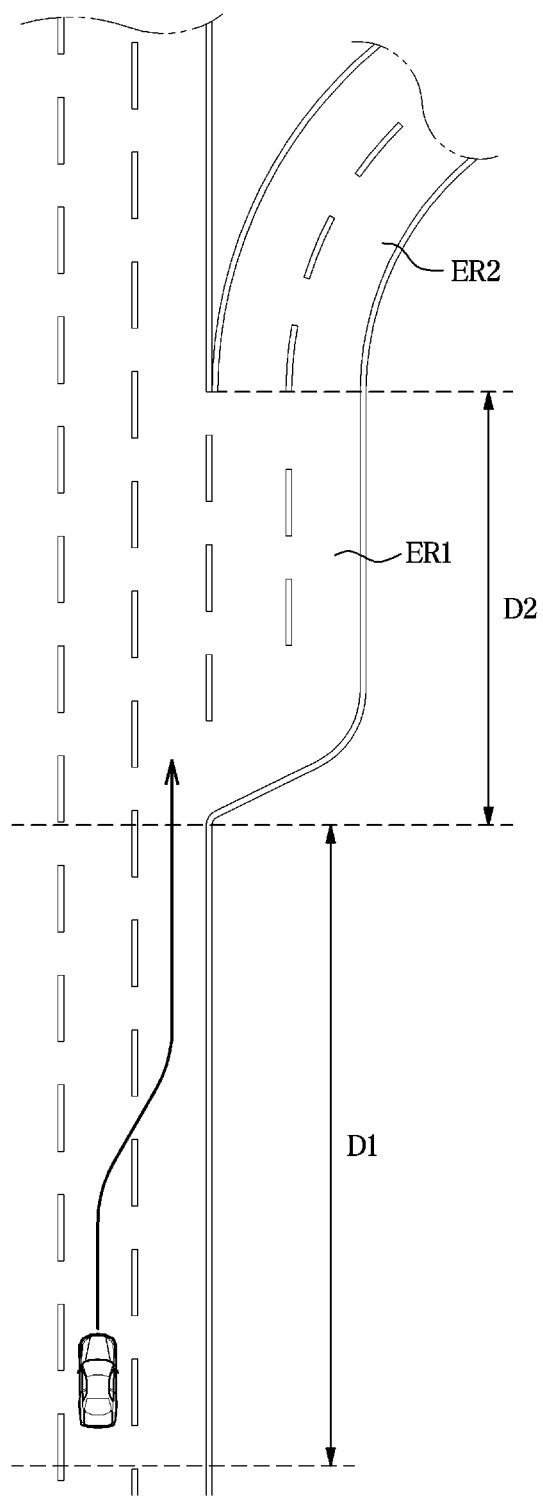

[FIG. 8]
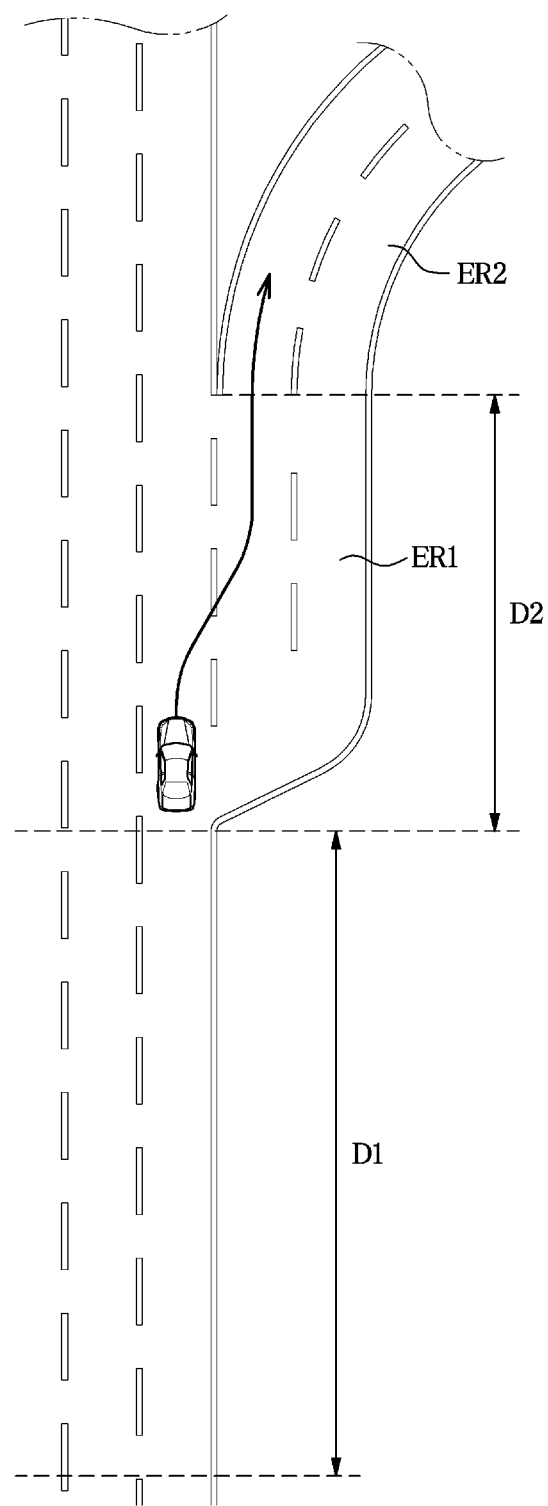

APPARATUS AND METHOD FOR ASSISTING DRIVING OF VEHICLE

CROSS-REFERENCE TO RELATED APPLICATION(S)

This application is based on and claims priority under 35 U.S.C. § 119 to Korean Patent Application No. 10-2021-0055243, filed on Apr. 28, 2021, in the Korean Intellectual Property Office, the disclosure of which is incorporated by reference herein in its entirety.

BACKGROUND

1. Field

The disclosure relates to an apparatus and method for assisting driving of a vehicle, and more particularly, to an apparatus and method for assisting driving of a vehicle capable of assisting exit and entry of the vehicle from and into a road.

2. Description of the Related Art

Vehicles are the most common means of transportation in modern society, and the number of people using vehicles is increasing. While with the development of vehicle technology, there are advantages such as ease of movement over long distances and making life easier, in places with high population density, such as in Korea, road traffic conditions worsen and traffic congestion becomes serious frequently.

Recently, in order to reduce the burden on a driver and increase convenience, research on a vehicle equipped with an advanced driver assist system (ADAS) that actively provides information on a vehicle state, a driver state, and a surrounding environment is being actively conducted.

As an example of the advanced driver assist system mounted on a vehicle, there are a forward collision avoidance system (FCA), an automatic emergency brake system (AEB), a driver attention warning system (DAW), and the like. These systems determine the risk of collision with an object in a driving situation of a vehicle, and provide collision avoidance through emergency braking and a warning in a collision situation.

However, a conventional driver assist system does not assist a driver with respect to, for example, entry or exit of a vehicle into or from an expressway, so that the driver is required to enter or exit the vehicle into or from the expressway based solely on navigation information of the vehicle. Due to this, it frequently occurs that drivers miss an entry road or an exit road of an expressway.

SUMMARY

It is an aspect of the disclosure to provide an apparatus and method for assisting driving of a vehicle capable of assisting exiting and entry of the vehicle from and into a road.

It is an aspect of the disclosure to provide an apparatus and method for assisting driving of a vehicle capable of assisting exiting and entry of the vehicle from and into a road by guiding a lane change according to a route of a navigation.

Additional aspects of the disclosure will be set forth in part in the description which follows and, in part, will be obvious from the description, or may be learned by practice of the disclosure.

In accordance with an aspect of the disclosure, an apparatus for assisting driving of a vehicle includes a camera installed in the vehicle to have a front field of view of the vehicle and obtain image data, and a controller to process the image data. The controller is configured to identify objects surrounding the vehicle and lanes defining a road on which the vehicle travels based on the processing of the image data, identify a lane in which the vehicle travels based on relative positions of the surrounding objects, and control the vehicle to change the lane based on a distance from the road on which the vehicle is traveling to an additional lane for entering an exit road.

In accordance with an aspect of the disclosure, a method for assisting driving of a vehicle includes obtaining image data by a camera installed in the vehicle to have a front field of view of the vehicle, identifying objects surrounding the vehicle and lanes defining a road on which the vehicle travels by a processor based on the processing of the image data, identifying a lane in which the vehicle travels by the processor based on relative positions of the surrounding objects, and controlling the vehicle to change the lane based on a distance from the road on which the vehicle is traveling to an additional lane for entering an exit road.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 illustrates a configuration of a vehicle according to an embodiment;

FIG. 2 illustrates field of views of a camera and a radar included in a driver assistance apparatus according to an embodiment;

FIG. 3 illustrates software modules of a controller included in the driver assistance apparatus according to an embodiment;

FIG. 4 illustrates an example for the driver assistance apparatus according to an embodiment to identify a lane in which a vehicle travels;

FIG. 5 illustrates an example of a method in which the driver assistance apparatus according to an embodiment evaluates the reliability of a lane identified as a lane in which a vehicle travels;

FIG. 6 illustrates an example of a method in which the driver assistance apparatus according to an embodiment guides a vehicle to an exit road of a road;

FIG. 7 illustrates an example of a route generated by the driver assistance apparatus for a change in a lane of a vehicle according to an embodiment; and FIG. 8 illustrates another example of a route generated by the driver assistance apparatus for a change in a lane of a vehicle according to an embodiment.

DETAILED DESCRIPTION

Like reference numbers refer to like elements throughout this specification. This specification does not describe all components of the embodiments, and general contents in the technical field to which the disclosure belongs or overlapping contents between the embodiments will not be described. The terms "part," "module," "member," and "block" as used herein, may be implemented as software or hardware, and according to embodiments, a plurality of "parts," "modules," "members," or "blocks" may be implemented as a single component, or a single "portion," "module," "member," or "block" may include a plurality of components.

Throughout this specification, when a portion is "connected" to another portion, this includes the case in which the portion is indirectly connected to the other portion, as well as the case in which the portion is directly connected to the other portion, and the indirect connection includes a connection through a wireless communication network.

Also, it will be understood that the terms "includes," "comprises," "including," and/or "comprising," when used in this specification, specify the presence of a stated component, but do not preclude the presence or addition of one or more other components.

In the present specification, it will also be understood that when an element is referred to as being "on" or "over" another element, it may be directly on the other element or intervening elements may also be present.

It will be understood that although the terms first, second, etc. may be used herein to describe various components, these components should not be limited by these terms, and the terms are only used to distinguish one component from another.

The singular expressions herein may include plural expressions, unless the context clearly dictates otherwise.

Reference numerals used in operations are provided for convenience of description, without describing the order of the operations, and the operations may be executed in a different order from the stated order unless a specific order is definitely specified in the context.

Hereinafter, a principle of action and embodiments of the disclosure will be described with reference to the accompanying drawings.

FIG. 1 illustrates a configuration of a vehicle according to an embodiment.

As illustrated in FIG. 1, a vehicle 1 includes a navigation system 10, a driving device 20, a braking device 30, a steering device 40, and a driver assistance apparatus 100. These devices may communicate with each other through a vehicle communication network NT. For example, the devices 10, 20, 30, 40, and 100 included in the vehicle 1 may transmit and receive data through Ethernet, MOST (Media Oriented Systems Transport), Flexray, CAN (Controller Area Network), LIN (Local Interconnect Network), and the like.

The navigation system 10 may generate a route to a destination input by the driver through input of a driver, and may provide the generated route to the driver. The navigation system 10 may receive a GNSS signal through a global navigation satellite system (GNSS) and identify a location of the vehicle 1 based on the GNSS signal. The navigation system 10 may generate a route to a destination based on a location (coordinates) of the destination input by the driver and a current location (coordinates) of the vehicle 1.

The navigation system 10 may provide map data and location data of the vehicle 1 to the driver assistance apparatus 100. The navigation system 10 may also provide information on a route to a destination to the driver assistance apparatus 100. For example, the navigation system 10 may provide information, such as a distance to an entry lane for the vehicle 1 to enter a new road and a distance to an exit road from a road on which the vehicle 1 is currently traveling, to the driver assistance apparatus 100.

The driving device 20 may move the vehicle 1 and include, for example; an engine, an engine management system (EMS), a transmission, and a transmission control unit (TCU).

The engine may generate power for driving the vehicle 1, and the engine management system may control the engine in response to an intention of the driver to accelerate through an accelerator pedal or a request from the driver assistance apparatus 100.

The transmission may transmit power generated by the engine to the wheels, and the transmission control unit may control the transmission in response to a shift command of the driver through a shift lever and/or a request from the driver assistance apparatus 100.

The braking device 30 may stop the vehicle 1, and may include, for example, a brake caliper and an electronic brake control module (EBCM).

The brake caliper may decelerate or stop the vehicle 1 by using friction with a brake disk, and the electronic brake control module may control the brake caliper in response to a braking intention of the driver through the brake pedal and/or a request from the driver assistance apparatus 100.

For example, the electronic brake control module may receive a deceleration request including deceleration from the driver assistance apparatus 100, and may control the brake caliper electrically or hydraulically such that the that the vehicle 1 is decelerated depending on the requested deceleration.

The steering device 40 may include an electronic power steering control module (EPS).

The steering device 40 may change a driving direction of the vehicle 1, and the electronic power steering control module may assist an operation of the steering device 40 such that the driver may easily manipulate a steering wheel in response to a steering intention of the driver through the steering wheel. The electronic power steering control module may also control the steering device 40 in response to a request from the driver assistance apparatus 100. For example, the electronic power steering control module may receive a steering request including a steering torque from the driver assistance apparatus 100 and control the steering device 40 to steer the vehicle 1 depending on the requested steering torque.

The driver assistance apparatus 100 may provide various functions to the driver. For example, the driver assistance apparatus 100 may provide lane departure warning (LDW), lane keeping assist (LKA), high beam assist (HBA), automatic emergency braking (AEB), traffic sign recognition (TSR), adaptive cruise control (ACC), blind spot detection (BSD), and the like.

The driver assistance apparatus 100 includes a camera 110, a radar 120, and a controller 140. The driver assistance apparatus 100 is not limited to that illustrated in FIG. 1, and may further include a lidar to scan around the vehicle 1 and detect an object.

The camera 110 may have a field of view 110a directing to the front of the vehicle 1 as illustrated in FIG. 2. The camera 110 may be installed, for example, on a front windshield of the vehicle 1.

The camera 110 may photograph the front of the vehicle 1 and obtain image data of the front of the vehicle 1. The image data of the front of the vehicle 1 may include information on other vehicles or pedestrians or cyclists or lanes (markers for distinguishing lanes) located in the front of the vehicle 1.

The camera 110 may include a plurality of lenses and an image sensor. The image sensor may include a plurality of photodiodes to convert light into an electrical signal, and the plurality of photodiodes may be arranged in a two-dimensional matrix.

The camera 110 may be electrically connected to the controller 140. For example, the camera 110 may be connected to the controller 140 through the vehicle communication network NT, connected to the controller 140 through a hard wire, or connected to the controller 140 through a printed circuit board (PCB). The camera 110 may transmit the image data in the front of the vehicle 1 to the controller 140.

The radar 120 may have a field of sensing 120a directing to the front of the vehicle 1 as illustrated in FIG. 2. The radar 120 may be installed, for example, on a grille or a bumper of the vehicle 1.

The radar 120 may include a transmission antenna (or a transmission antenna array) to radiate a transmitted radio wave toward the front of the vehicle 1, and a reception antenna (or a reception antenna array) to receive a reflected radio wave reflected by an object. The radar 120 may obtain detection data from the transmitted radio wave transmitted by the transmission antenna and the reflected radio wave received by the reception antenna. The detection data may include distance information and speed information on other vehicles or pedestrians or cyclists located in the front of the vehicle 1. The radar 120 may calculate a relative distance to the object based on a phase difference (or time difference) between the transmitted radio wave and the radio reflected wave, and calculate a relative speed of the object based on a frequency difference between the transmitted radio wave and the reflected radio wave.

The radar 120 may be connected to the controller 140 through, for example, the vehicle communication network NT, a hard wire, or a printed circuit board. The radar 120 may transmit the detection data to the controller 140.

The controller 140 may be variously referred to as an electronic control unit (ECU) or a domain control unit (DCU).

The controller 140 may be electrically connected to the camera 110 and the radar 120. The controller 140 may also be connected to the navigation system 10, the driving device 20, the braking device 30, and the steering device 40 through the vehicle communication network NT.

The controller 140 may be provided to be separated from the camera 110 and/or the radar 120. For example; the controller 140 may be provided in a housing separated from a housing of the camera 110 and/or a housing of the radar 120. The controller 140 may exchange data with the camera 110 and/or the radar 120 through a wide bandwidth network.

The controller 140 includes a processor 141 and a memory 142.

The processor 141 may process the image data of the camera 110 and process the detection data of the radar 120. The processor 141 may generate a driving signal, a braking signal, and a steering signal for controlling the driving device 10, the braking device 20, and the steering device 30, respectively.

For example, the processor 141 may include an image processor to process the image data of the camera 110 and/or a digital signal processor to process the detection data of the radar 120 and/or a micro control unit (MCU) to generate a driving signal/braking signal/steering signal.

The memory 142 may store a program (e.g., a collection of a plurality of instructions) and/or data for the processor 141 to process the image data, and a program and/or data for the processor 141 to process the detection data. The memory 142 may also store a program and/or data for the processor 141 to generate a driving signal and/or a braking signal and/or a steering signal.

The memory 142 may temporarily store the image data received from the camera 110 and/or the detection data received from the radars 120 and 130, and may temporarily store the processing result of the image data and/or the detection data of the processor 141.

The memory 142 may include a non-volatile memory such as a flash memory, a read-only memory (ROM), and an erasable programmable read-only memory (EPROM), as well as a volatile memory such as S-RAM and D-RAM.

The controller 140 may functionally include a perception module 146 provided to collect information on the vehicle 1 and objects around the vehicle 1, a decision module 147 provided to generate a detailed route to avoid a collision with the objects around the vehicle 1, and a control module 148 provided to control the vehicle 1 to travel along the generated detailed route. The perception module 146, the decision module 147, and the control module 148 may be a software module (program and data) stored in the memory 142 or a hardware module (ASIC or FPGA) included in the processor 141.

The perception module 146 of the controller 140 may include a sensor fusion 146a for fusing the image data of the camera 110 and the detection data of the radar 120 to detect objects around the vehicle 1.

For example, the controller 140 may detect objects (e.g., other vehicles, pedestrians, cyclists, etc.) around the vehicle 1 based on the image data of the camera 110 and the detection data of the radar 120.

The controller 140 may obtain relative positions (distances from the vehicle and angles with respect to the driving direction) and classifications (e.g., whether the objects are other vehicles, pedestrians, or cyclists, etc.) of objects around the vehicle 1 based on the image data of the camera 110. The controller 140 may obtain relative positions (distances from the vehicle and angles with respect to the driving direction) and relative speeds of objects around the vehicle 1 based on the detection data of the radar 120. The controller 140 may also match the objects detected by the detection data to the objects detected by the image data, and obtain the classifications, the relative positions, and the relative speeds of the objects around the vehicle 1 based on the matching result.

Also, the controller 140 may obtain information on a lane of a road on which the vehicle 1 travels based on the image data of the camera 110. For example, the controller 140 may identify a lateral position of a lane.

The perception module 146 may include a localization 146b for identifying the location of the vehicle 1 based on the image data of the camera 110, the detection data of the radar 120, the map data, and the location data of the vehicle 1.

For example, the controller 140 may identify a landmark around the vehicle 1 from the map data based on the location data of the vehicle 1. The controller 140 may identify a relative position of the landmark with respect to the vehicle 1 based on the image data and the detection data. The controller 140 may correct the location data of the vehicle 1 based on absolute coordinates of the landmark based on the map data and relative coordinates based on the image data and the detection data. In other words, the controller 140 may identify absolute coordinates of the vehicle 1.

The perception module 146 includes a map projection 146c for projecting the vehicle 1 and the objects around the vehicle 1 onto the map data.

For example, the controller 140 may project the vehicle 1 onto the map data based on the location data of the vehicle 1, and project objects around the vehicle 1 onto the map data based on the relative positions and relative speeds of the objects around the vehicle 1.

The decision module 147 of the controller 140 may include a collision risk decision 147a for predicting a collision with the objects around the vehicle 1 and identifying a risk of collision based on the relative positions and relative speeds of the objects around the vehicle 1.

For example, the controller 140 may calculate a time to collision (TTC) (or distance to collision) between the vehicle 1 and a surrounding object based on the positions (distances) and relative speeds of the surrounding objects. The controller 140 may also identify a risk of collision with the surrounding object based on the time to collision or the distance to collision.

The decision module 147 may include a target selection 147b for selecting a target to avoid a collision or the target to follow.

For example, in the automatic emergency braking, the controller 140 may select the surrounding object with the highest risk of collision (or the shortest time to collision) as a target based on the risk of collision (or time to collision). Also, in the cruise control, the controller 140 may select, as a target, a preceding vehicle traveling in the same lane as that in which the vehicle 1 travels.

The decision module 147 may include a path generation 147c for generating a detailed path to avoid a collision with a target or a detailed path to reach a destination.

For example, the controller 140 may generate a detailed route for maintaining a lane to follow a target or a detailed route for changing a lane to avoid a collision with the target.

The control module 148 of the controller 140 may include a drive control 148a for controlling the driving device 20, a brake control 148b for controlling the braking device 30, and a steering control 148c for controlling the steering device 40.

The controller 140 may generate a driving signal, a braking signal, or a steering signal to follow a target or to avoid a collision with the target. For example, the controller 140 may transmit the driving signal and/or the braking signal for causing a distance to the target (or time until reaching a location of a preceding vehicle) to be a distance set by the driver, to the driving device 20 and/or to the braking device 30. The controller 140 may also transmit the braking signal and/or the steering signal for avoiding a collision with the target to the braking device 30 and/or the steering device 40.

Also, the controller 140 may obtain information on a route to a destination (e.g., a distance to an entry lane or an exit road of a road) through the navigation system 10. The controller 140 may obtain information on a lane on which the vehicle 1 is traveling (e.g., in which lane the vehicle is traveling from a center line, etc.) based on the image data of the camera 110. The controller 140 may guide the driver to change the lane or provide a steering signal for changing the lane to the steering device 40 so that the vehicle 1 may exit the road or enter the road based on the information on the route to the destination and the information on the lane.

The driver assistance apparatus 100 is not limited to that illustrated in FIG. 2, and may further include a lidar provided to detect an object while scanning the surroundings of the vehicle 1.

The driver assistance apparatus 100 may obtain a route to a destination of the vehicle 1 through the navigation system 10. The driver assistance apparatus 100 may also generate a detailed route for reaching the destination in a lane in which the vehicle 1 currently travels. For example, the driver assistance apparatus 100 may identify whether to maintain the lane in which the vehicle 1 currently travels or to change the lane in order to arrive at the destination.

The driver assistance apparatus 100 may identify a lane in which the vehicle 1 currently travels in order to generate a detailed route of the vehicle 1.

The controller 140 may identify the number of lanes on the road on which the vehicle 1 currently travels from the map data.

The controller 140 may identify a lane in which the vehicle 1 currently travels based on the locations of objects around the vehicle 1.

For example, the controller 140 may, based on the image data and/or the detection data, identify a relative position of a moving object (e.g., another vehicle, etc.) around the vehicle 1 and/or a relative position of a stationary object (e.g., traffic infrastructure, etc.) around the vehicle 1 and/or a relative position of a central reservation.

The controller 140 may identify a moving object and a stationary object based on a relative speed of a surrounding object. The controller 140 may identify the surrounding object as a stationary object when the relative speed of the surrounding object is the same as a driving speed of the vehicle 1 and the driving direction is opposite. The controller 140 may also identify the surrounding object as a moving object when the relative speed of the surrounding object is different from the driving speed of the vehicle 1.

The controller 140 may identify a lane in which the surrounding object is located based on a relative position of the surrounding object. The controller 140 may identify a lateral distance of the surrounding object based on the relative position of the surrounding object. The controller 140 may also identify a lane in which the surrounding object is located based on a quotient obtained by dividing the lateral distance by a lane width.

The controller 140 may calculate a driving lane score for each lane of a road based on the lane in which the surrounding object is located, and may identify a driving lane in which the vehicle 1 travels based on the calculated driving lane score.

For example, the controller 140 may calculate driving lane scores by a moving object moving in a-th lane of the left of the vehicle 1 using [Equation 1].

$$P_{m.left}[i]=0, i=0,\ldots,a-1$$

$$P_{m.left}[i]=1, i=a,\ldots,N-1 \qquad \text{[Equation 1]}$$

Herein, 'Pm.left' represents a driving lane score by a left moving object, 'a' represents a position of a lane on which the left moving object moves (a-th lane of the left), and 'N' represents the number of lanes on a road.

As such, when a moving object is detected at the left of the vehicle 1, the controller 140 may impart driving lane scores to the lane in which the moving object is detected and the right lanes thereof.

The controller 140 may calculate driving lane scores by a moving object moving in a-th lane of the right of the vehicle 1 using [Equation 2].

$$P_{m.right}[i]=1, i=0,\ldots,N-a-1$$

$$P_{m.right}[i]=0, i=N-a,\ldots,N-1 \qquad \text{[Equation 2]}$$

Herein, 'Pm.right' represents a driving lane score by a right moving object, 'a' represents a position of a lane on which the right moving object moves (a-th lane of the right), and 'N' represents the number of lanes on a road.

As such, when a moving object is detected at the right of the vehicle 1, the controller 140 may impart driving lane scores to the lane in which the moving object is detected and the left lanes thereof.

The controller 140 may calculate driving lane scores by a stationary object located in the a-th lane of the left of the vehicle 1 using [Equation 3].

$$P_{s.left}[i]=1, i=0,\ldots,a-1$$

$$P_{s.left}[i]=0, i=a,\ldots,N-1 \qquad \text{[Equation 3]}$$

Herein, 'Ps.left' represents a driving lane score by a left stationary object, 'a' represents a position of a lane on which the left stationary object is located (a-th lane of the left), and 'N' represents the number of lanes on a road.

As such, when a stationary object is detected at the left of the vehicle 1, the controller 140 may impart driving lane scores to the left lanes of the lane in which the stationary object is detected.

The controller 140 may calculate driving lane scores by a stationary object located in the a-th lane of the right of the vehicle 1 using [Equation 4].

$$P_{s.right}[i]=0, i=0, N-a-1$$

$$P_{s.right}[i]=1, i=N-a,\ldots,N-1 \qquad \text{[Equation 4]}$$

Herein, 'Ps.right' represents a driving lane score by a right stationary object, 'a' represents a position of a lane on which the right stationary object is located (a-th lane of the right), and 'N' represents the number of lanes on a road.

As such, when a stationary object is detected at the right of the vehicle 1, the controller 140 may impart driving lane scores to the right lanes of the lane in which the stationary object is detected.

The controller 140 may calculate the driving lane score by a central reservation of the vehicle 1 using [Equation 5].

$$P_{rb}[i]=1, i=a-1$$

$$P_{rb}[i]=0, i \neq a-1 \qquad \text{[Equation 5]}$$

Herein, 'Prb' represents a driving lane score by the central reservation, 'a' represents a position of the central reservation (a-th lane of the left), and 'N' represents the number of lanes on a road.

The controller 140 may identify a lane in which the vehicle 1 is traveling based on the sum of the driving lane score by the left moving object, the driving lane score by the right moving object, the driving lane score by the left stationary object, the driving lane score by the right stationary object, and the driving lane score by the central reservation.

The controller 140 may identify a lane in which the vehicle 1 is traveling using [Equation 6].

$$P[i]=P_{m.left}[i]+P_{m.right}[i]+P_{s.left}[i]+P_{s.right}[i]+P_{rb}[i] \qquad \text{[Equation 6]}$$

Herein, 'P' represents a driving lane score, 'i' represents (lane number−1), 'Pm.left' represents a driving lane score by the driving lane score by the left moving object, 'Pm.right' represents a driving lane score by the driving lane score by the right moving object, 'Ps.left' represents a driving lane score by the driving lane score by a left stationary object, 'Ps.right' represents a driving lane score by the driving lane score by a right stationary object, and 'Prb' represents a driving lane score by the driving lane score by the central reservation.

The controller 140 may identify a highest driving lane score among a driving lane score P[0] of a first lane, a driving lane score P[1] of a second lane, a driving lane score P[3] of a third lane, . . . , and a driving lane score P[N−1] of a N-th lane, and may identify a lane corresponding to the maximum driving lane score as a lane in which the vehicle 1 is traveling.

FIG. 4 illustrates an example for the driver assistance apparatus according to an embodiment to identify a lane in which a vehicle travels.

As illustrated in FIG. 4, a first moving object 2 moves in a second left lane of the vehicle 1, a second moving object 3 moves in a first left lane of the vehicle 1, and a third moving object 4 moves in a first right lane of the vehicle 1.

A driving lane score Pm.left[0] of the first lane by the first moving object 2 may be 0, a driving lane score Pm.left[1] of the second lane may be 1, a driving lane score Pm.left[2] of the third lane may be 1, and a driving lane score Pm.left[3] of the fourth lane may be 1.

The driving lane score Pm.left[0] of the first lane by the second moving object 3 may be 0, the driving lane score Pm.left[1] of the second lane may be 0, the driving lane score Pm.left[2] of the third lane may be 1, and the driving lane score Pm.left[3] of the fourth lane may be 1.

A driving lane score Pm.right[0] of the first lane by the third moving object 4 may be 1, a driving lane score Pm.right[1] of the second lane may be 1, a driving lane score Pm.right[2] of the third lane may be 0, and a driving lane score Pm.right[3] of the fourth lane may be 0.

The driving lane score P[0] of the first lane may be 1, the driving lane score P[1] of the second lane may be 2, the driving lane score P[2] of the third lane may be 3, and the driving lane score P[3] of the fourth lane may be 2.

The controller 140 may identify the third lane having the highest driving lane score as a lane in which the vehicle 1 is traveling.

As such, the controller 140 may calculate respective driving lane scores of the plurality of lanes for at least one object (moving object or stationary object). The controller 140 may calculate a sum of the respective driving lane scores of the plurality of lanes and identify a lane in which the vehicle 1 is traveling based on the sum of the respective driving lane scores of the plurality of lanes.

Thereafter, the controller 140 may evaluate the reliability of a lane identified as the lane in which the vehicle 1 is traveling.

FIG. 5 illustrates an example of a method in which the driver assistance apparatus according to an embodiment evaluates the reliability of a lane identified as a lane in which a vehicle travels.

A method 1000 of evaluating the reliability of a lane on which the vehicle 1 travels, which is identified by the driver assistance apparatus 100, is described below with reference to FIG. 5.

The driver assistance apparatus 100 calculates a driving lane score (1010).

The controller 140 may calculate respective driving lane scores of the plurality of lanes for at least one object (moving object or stationary object). The controller 140 may calculate the sum of the respective driving lane scores of the plurality of lanes.

The driver assistance apparatus 100 identifies whether a driving lane of the vehicle 1 is determined (1020).

The controller 140 may, when the reliability of a lane identified as the lane in which the vehicle 1 is traveling is high, determine the lane as a driving lane of the vehicle 1. The controller 140 may identify whether the previously identified lane is determined as the driving lane of the vehicle 1.

When the driving lane of the vehicle 1 is determined (YES in 1020), the driver assistance apparatus 100 identifies whether there is one lane having the highest driving lane score (1030).

As described above, the controller 140 may calculate the sum of the respective driving lane scores of the plurality of lanes.

In this case, the plurality of lanes may represent the highest driving lane score depending on objects surrounding the vehicle 1. For example, when the object surrounding the vehicle 1 does not exist, the driving lane scores of all of the lanes may be the same. In this case, there may be a plurality of lanes having the highest driving lane score.

When there is one lane having the highest driving lane score (YES in 1030), the driver assistance apparatus 100 increases the reliability of lane identification (1040).

The controller 140 may increase a reliability value of the lane identification by an increment.

When there is not only one lane having the highest driving lane score (NO in 1030), the driver assistance apparatus 100 decreases the reliability of lane identification (1045).

The controller 140 may decrease the reliability value of the lane identification by an increment.

The driver assistance apparatus 100 identifies whether the reliability is equal to or greater than a reference value (1050).

The controller 140 may compare the reliability value by the operation 1040 or the operation 1045 with the reference value and identify whether the reliability value is equal to or greater than the reference value.

When the reliability is equal to or greater than the reference value (YES in 1050), the driver assistance apparatus 100 determines the driving lane of the vehicle 1 (1060).

The controller 140 may determine the driving lane of the vehicle 1 as a lane based on the driving lane score.

When the reliability is not equal to or greater than the reference value (NO in 1050), the driver assistance apparatus 100 does not determine the driving lane of the vehicle 1 (1065).

The controller 140 may not determine the driving lane of the vehicle 1.

When the driving lane of the vehicle 1 is not determined (NO in 1020), the driver assistance apparatus 100 identifies whether there is one lane having the highest driving lane score (1035).

The operation 1035 may be the same as the operation 1030 described above.

When there is one lane having the highest driving lane score (YES in 1035), the driver assistance apparatus 100 increases the reliability of lane identification (1070).

The controller 140 may increase the reliability value of the lane identification by an increment.

When there is not only one lane having the highest driving lane score (NO in 1035), the driver assistance apparatus 100 resets the reliability of lane identification (1075).

The controller 140 may reset the reliability value of lane identification to "0".

The driver assistance apparatus 100 identifies whether the reliability is equal to or greater than the reference value (1080).

The controller 140 may compare the reliability value by the operation 1070 or the operation 1075 with the reference value and identify whether the reliability value is equal to or greater than the reference value.

When the reliability is equal to or greater than the reference value (YES in 1080), the driver assistance apparatus 100 determines the driving lane of the vehicle 1 (1090).

The controller 140 may determine the driving lane of the vehicle 1 as a lane based on the driving lane score.

When the reliability is not equal to or greater than the reference value (NO in 1080), the driver assistance apparatus 100 does not determine the driving lane of the vehicle 1 (1095).

The controller 140 may not determine the driving lane of the vehicle 1.

As described above, the driver assistance apparatus 100 may evaluate the identified lane based on the driving lane score, and determine the lane in which the vehicle 1 is traveling based on the evaluation result.

The driver assistance apparatus 100 may track a lane in which the vehicle 1 travels.

The driver assistance apparatus 100 may identify a lane change based on the processing of the image data. For example, the controller 140 may identify a lane of the vehicle based on the processing of the image data. The controller 140 may identify coordinates of the left lane and coordinates of the right lane based on a center line of the vehicle 1. When a difference between the coordinates of the current left lane and the coordinates of the previous left lane is equal to or greater than a positive threshold value, and a difference between the coordinates of the current right lane and the coordinates of the previous right lane is equal to or greater than a positive threshold value, the controller 140 may identify the lane change as the left lane. When the difference between the coordinates of the current left lane and the coordinates of the previous left lane is less than or equal to a negative threshold value, and the difference between the coordinates of the current right lane and the coordinates of the previous right lane is less than or equal to a negative threshold value, the controller 140 may identify the lane change as the right lane.

The driver assistance apparatus 100 may change the number of the lane in which the vehicle 1 travels based on the lane change of the vehicle 1. For example, the controller 140 may decrease the number of the lane by "1" based on the lane change of the vehicle 1 to the left lane. The controller 140 may also increase the number of the lane by "1" based on the lane change of the vehicle 1 to the right lane.

The driver assistance apparatus 100 may change the number of the lane in which the vehicle 1 travels based on the branching of the lane of the road. For example, based on the branching of the lane of the road, the controller 140 may identify the number of the branched lane in which the vehicle 1 travels based on a difference between the stored lane number and the number of lanes of the road before the branching.

Also, the driver assistance apparatus 100 may change the number of the lane in which the vehicle 1 travels based on the merging of the lanes of the road. For example, based on the merging of the lanes of the road, the controller 140 may identify the number of the merged lane in which the vehicle 1 travels based on the sum of the stored lane number and the number of lanes on a new road.

FIG. 6 illustrates an example of a method in which the driver assistance apparatus according to an embodiment guides a vehicle to an exit road of a road. FIG. 7 illustrates an example of a route generated by the driver assistance apparatus for a change in a lane of a vehicle according to an embodiment. FIG. 8 illustrates another example of a route generated by the driver assistance apparatus for a change in a lane of a vehicle according to an embodiment.

A method 1100 in which the driver assistance apparatus 100 guides the vehicle 1 to an exit road of a road will be described below with reference to FIGS. 6 to 8.

The driver assistance apparatus 100 obtains image data and detection data (1110).

The controller 140 may obtain the image data from the camera 110 and may obtain the detection data from the radar 120, The controller 140 may obtain information on objects around the vehicle 1 including the relative positions and/or relative speeds of the surrounding objects based on the processing of the image data and/or the detection data. The controller 140 may also obtain information on a lane of a road on which the vehicle 1 travels based on the processing of the image data and/or the detection data.

The driver assistance apparatus 100 obtains map data (1120).

The controller 140 may obtain the map data from the navigation device 10 or may obtain the map data from an external device of the vehicle 1. The map data may include, for example, a navigation map of the navigation device 10 for guiding a route to a destination or a high-definition map (HD Map) for autonomous driving to the destination.

The driver assistance apparatus 100 identifies a lane on which the vehicle 1 travels (1130)

The controller 140 may identify a road on which the vehicle 1 travels based on the map data. The controller 140 may also identify the number of lanes on the road on which the vehicle 1 travels, based on the map data.

The driver assistance apparatus 100 identifies whether a distance between the vehicle 1 and a starting position of an additional lane ER1 for exiting the road is equal to or less than a first reference distance D1 (1140).

The controller 140 may identify the exiting from the road on which the vehicle 1 is currently traveling, based on the route to the destination obtained from the navigation device 10. The controller 140 may also identify, based on the map data, a position of an exit road ER2 for exiting the road on which the vehicle 1 is currently traveling and a starting position of the additional lane ER1 for entering the exit road ER2.

The controller 140 may identify the distance between the vehicle 1 and the starting position of the additional lane ER1 for entering the exit road ER2, based on the location of the vehicle 1 and the starting position of the additional lane ER1 for entering the exit road ER2. The controller 140 may also identify whether a distance between the vehicle 1 and the starting position of the additional lane ER1 for entering the exit road ER2 is less than or equal to the first reference distance D1.

The first reference distance D1 may be experimentally or empirically set for safe entry into the exit road ER2. The first reference distance D1 may be set by a driver.

The first reference distance D1 may vary based on the number of lanes on the road on which the vehicle 1 travels and the lane on which the vehicle 1 travels. As the number of lane changes required to enter the exit road ER2 increases (e.g., when the number of lanes is large and the vehicle 1 travels in the first lane or the second lane, etc.), the first reference distance D1 may increase.

Also, the first reference distance D1 may vary based on the driving speed of the vehicle 1. For example, as the driving speed of the vehicle 1 increases, the first reference distance D1 may increase.

When the distance between the vehicle 1 and the starting position of the additional lane ER1 for entering the exit road ER2 is not less than or equal to the first reference distance D1 (NO in 1140), the driver assistance apparatus 100 controls the vehicle 1 to maintain the lane (1145).

When the distance between the vehicle 1 and the starting position of the additional lane ER1 for entering the exit road ER2 is greater than the first reference distance D1, preparation to enter the exit road ER2 may be unnecessary. Accordingly, the controller 140 may control the driving device 20, the braking device 30, or the steering device 40 such that the vehicle 1 maintains the lane.

When the distance between the vehicle 1 and the starting position of the additional lane ER1 for entering the exit road ER2 is less than or equal to the first reference distance D1 (YES in 1140), the driver assistance apparatus 100 identifies whether the lane on which the vehicle 1 travels is a last lane (or the first lane) of the road (1150).

When the distance between the vehicle 1 and the starting position of the additional lane ER1 for entering the exit road ER2 is less than or equal to the first reference distance D1, the controller 140 may identify whether the lane change is necessary for exiting the road.

When the exit road is located outside the last lane, the controller 140 may identify whether the lane on which the vehicle 1 travels is the last lane of the road. Also, when the exit road is located inside the first lane, the controller 140 may identify whether the lane on which the vehicle 1 travels is the first lane of the road.

When the lane on which the vehicle 1 travels is not the last lane (or the first lane) of the road (NO in 1150), the driver assistance apparatus 100 recommends the lane change to the driver or automatically performs the lane change (1155).

When the lane on which the vehicle 1 travels is not the last lane (or the first lane) of the road, the lane change is required to enter the exit road ER2 of the road. For example, as illustrated in FIG. 7, when the distance between the vehicle 1 and the starting position of the additional lane ER1 for entering the exit road ER2 is less than or equal to the first reference distance D1 and the vehicle 1 travels in the first lane, the lane change is necessary for the vehicle 1 to exit the road through the exit road ER2 located outside the second lane.

The controller 140 may, for example, display an image message for recommending the lane change to the driver on a display of the vehicle 1 or output a sound message for recommending the lane change to the driver through a speaker of the vehicle 1.

Also, the controller 140 may control the driving device 20, the braking device 30, and/or the steering device 40 to automatically attempt the lane change.

As a result of the lane change of the vehicle 1, the vehicle 1 may travel in the last lane (or the first lane) of the road.

When the lane on which the vehicle 1 travels is the last lane (or the first lane) of the road (YES in 1150), the driver assistance apparatus 100 identifies whether the distance between the vehicle 1 and the exit road ER2 of the road is less than or equal to a second reference distance D2 (1160).

The controller 140 may identify a location of the exit road ER2 for exiting the road on which the vehicle 1 is currently driving, based on the map data.

The controller 140 may identify a distance between the exit road ER2 of the road and the vehicle 1 based on the location of the exit road ER2. The controller 140 may also identify whether the distance between the exit road ER2 of the road and the vehicle 1 is less than or equal to the second reference distance D2.

The second reference distance D2 may be, for example, substantially equal to a length of the additional lane ER1 for entering the exit road ER2.

When the distance between the location of the exit road ER2 and the vehicle 1 is not less than or equal to the second reference distance D2 (NO in 1160), the driver assistance apparatus 100 controls the vehicle 1 to control the vehicle speed and maintain the lane in order to exit the road (1165).

When the distance between the location of the exit road ER2 and the vehicle 1 is greater than the second reference distance D2, the vehicle 1 may not enter the additional lane ER1 for entering the exit road ER2. Accordingly, the controller 140 may control the driving device 20, the braking device 30, or the steering device 40 such that the vehicle 1 maintains the vehicle speed and the lane in order to exit the road.

When the distance between the location of the exit road ER2 and the vehicle 1 is less than or equal to the second reference distance D2 (YES in 1160), the driver assistance apparatus 100 recommends the lane change to the driver or automatically performs the lane change (1170).

When the distance between the location of the exit road ER2 and the vehicle 1 is less than or equal to the second reference distance D2, the vehicle 1 may enter the additional lane ER1 for entering the exit road ER2. For example, as illustrated in FIG. 8, when vehicle 1 travels in the last lane of the road and passes the starting position of the additional lane ER1 for entering the exit road ER2, the lane change to the additional lane ER1 is necessary for the vehicle 1 to enter the exit road ER2.

The controller 140 may, for example, display an image message for recommending the lane change to the driver on the display of the vehicle 1 or output a sound message for recommending the lane change to the driver through the speaker of the vehicle 1.

Also, the controller 140 may control the driving device 20, the braking device 30, and/or the steering device 40 to automatically attempt the lane change.

As a result of the lane change of the vehicle 1, the vehicle 1 may travel in the additional lane ER1 for entering the exit road ER2. The vehicle 1 may also exit the road through the exit road ER2.

As described above, the driver assistance apparatus 100 may identify a lane in which the vehicle 1 is traveling and recommend a lane change for exiting the road to the driver based on the lane in which the vehicle 1 is traveling.

Therefore, the driver may operate the vehicle 1 to change the lane at an appropriate time and exit the road.

As is apparent from the above, according to an embodiment of the disclosure, an apparatus and method for assisting driving of a vehicle capable of assisting exiting and entry of the vehicle from and into a road can be provided.

Further, according to an embodiment of the disclosure, an apparatus and method for assisting driving of a vehicle capable of assisting exiting and entry of the vehicle from and into a road by guiding a lane change according to a route of a navigation can be provided.

The disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a computer-readable recording medium.

The computer-readable recording medium includes any type of recording medium in which instructions readable by the computer are stored. For example, the recording medium may include a read only memory (ROM), a random access memory (RAM), a magnetic tape, a magnetic disk, a flash memory, an optical data storage device, and the like.

The device-readable storage medium may be provided in the form of a non-transitory storage medium. Herein, the term 'non-transitory' only means that the storage medium is a tangible device and does not include a signal (e.g., electromagnetic wave), this term does not distinguish between a case in which data is stored semi-permanently in a storage medium and a case in which data is temporarily stored. For example, the 'non-transitory storage medium' may include a buffer in which data is temporarily stored.

The embodiments disclosed with reference to the accompanying drawings have been described above. It will be understood by those skilled in the art that various changes in form and details may be made therein without departing from the spirit and scope of the disclosure as defined by the appended claims. The disclosed embodiments are illustrative and should not be construed as limiting.

What is claimed is:

1. An apparatus for assisting driving of a vehicle comprising:
    a camera installed in the vehicle to have a front field of view of the vehicle and obtain image data; and
    a controller to process the image data,
    wherein the controller is configured to:
    identify objects surrounding the vehicle and lane markers defining a road on which the vehicle travels based on the processing of the image data;
    identify a lane in which the vehicle travels based on relative positions of the surrounding objects; and
    control the vehicle to change lanes based on a distance to an additional lane for entering an exit road from the road on which the vehicle is traveling,
    wherein the controller is configured to:
    calculate, while the vehicle currently travels in the lane, driving lane scores for at least two lanes of the road based on the respective relative positions of the surrounding objects; and
    identify, while the vehicle currently travels in the lane, a lane having a highest driving lane score, from among the at least two lanes of the road, as the lane in which the vehicle currently travels based on the calculating of the driving lane cores,
    wherein the controller is configured to calculate the driving lane scores by:
    a first driving lane score impartation in which, when an object moving on a left side of the vehicle is detected, driving lane scores are imparted to a lane in which the moving object is detected and all lanes to the right thereof;
    a second driving lane score impartation, in which, when an object moving on a right side of the vehicle is detected, driving lane scores are imparted to a lane in which the moving object is detected and all lanes to the left thereof;
    a third driving lane score impartation, in which, when an object stationary on the left side of the vehicle is detected, driving lane scores are imparted to all lanes to the left of a lane in which the stationary object is detected, and
    a fourth driving lane score impartation, in which, when an object stationary on the right side of the vehicle is detected, driving lane scores are imparted to all lanes to the right of a lane in which the stationary object is detected.

2. The apparatus according to claim 1, wherein the controller is configured to identify the lane in which the vehicle travels based on a lane in which a central reservation is located when the central reservation is detected.

3. The apparatus according to claim 1, wherein the controller is configured to:

increase a reliability value of the lane identified as the traveling lane when there is one lane having the highest driving lane score;

decrease the reliability value of the lane identified as the traveling lane when there are two or more lanes having the highest driving lane score; and determine the lane identified as the traveling lane based on the reliability value of the lane identified as the traveling lane being equal to or greater than a reference value.

4. The apparatus according to claim 1, wherein the controller is configured to control a steering device of the vehicle such that the vehicle changes lanes to a last lane of the road based on the distance to the additional lane being less than or equal to a first reference distance.

5. The apparatus according to claim 4, wherein the first reference distance is based on at least one of a vehicle speed of the vehicle or a lane in which the vehicle is traveling.

6. The apparatus according to claim 4, wherein the controller is configured to control the steering device of the vehicle such that the vehicle changes the lane to the additional lane based on a distance to a position, where the exit road is branched from the road on which the vehicle is traveling, being less than or equal to a second reference distance.

7. The apparatus according to claim 6, wherein the second reference distance is equal to a length of the additional lane.

8. A method for assisting driving of a vehicle comprising:
obtaining image data by a camera installed in the vehicle to have a front field of view of the vehicle;
identifying objects surrounding the vehicle and lane markers defining a road on which the vehicle travels by a processor based on the processing of the image data;
identifying a lane in which the vehicle travels by the processor based on relative positions of the surrounding objects; and
controlling the vehicle to change lanes based on a distance to an additional lane for entering an exit road from the road on which the vehicle is traveling,
wherein
the identifying of the lane in which the vehicle travels comprises:
calculating, while the vehicle currently travels in the lane, driving lane scores for at least two lanes of the road based on the respective relative positions of the surrounding objects; and
identifying, while the vehicle currently travels in the lane, a lane having a highest driving lane score, from among the at least two lanes of the road, as the lane in which the vehicle currently travels based on the calculating of the driving lane scores,
wherein the driving lane scores are calculated by:
a first driving lane score impartation, in which, when an object moving on a left side of the vehicle is detected, driving lane scores are imparted to a lane in which the moving object is detected and all lanes to the right thereof;
a second driving lane score impartation, in which, when an object moving on a right side of the vehicle is detected, driving lane scores are imparted to a lane in which the moving object is detected and all lanes to the left thereof;
a third driving lane score impartation, in which, when an object stationary on the left side of the vehicle is detected, driving lane scores are imparted to all lanes to the left of a lane in which the stationary object is detected; and
a fourth driving lane score impartation, in which, when an object stationary on the right side of the vehicle is detected, driving lane scores are imparted to all lanes to the right of a lane in which the stationary object is detected.

9. The method according to claim 8, wherein
the identifying of the lane in which the vehicle travels comprises identifying the lane in which the vehicle travels based on a lane in which a central reservation is located when the central reservation is detected.

10. The method according to claim 8, further comprising:
increasing a reliability value of the lane identified as the traveling lane when there is one lane having the highest driving lane score;
decreasing the reliability value of the lane identified as the traveling lane when there are two or more lanes having the highest driving lane score; and
determining the lane identified as the traveling lane based on the reliability value of the lane identified as the traveling lane being equal to or greater than a reference value.

11. The method according to claim 8, wherein
the changing a lane of the vehicle comprises changing the lane of the vehicle to a last lane of the road based on the distance to the additional lane being less than or equal to a first reference distance.

12. The method according to claim 11, wherein
the first reference distance is based on at least one of a vehicle speed of the vehicle or a lane in which the vehicle is traveling.

13. The method according to claim 11, wherein
the changing of the lane of the vehicle further comprises changing the lane of the vehicle to the additional lane based on a distance to a position, where the exit road is branched from the road on which the vehicle is traveling, being less than or equal to a second reference distance.

14. The method according to claim 13, wherein
the second reference distance is equal to a length of the additional lane.

15. A non-transitory computer-readable storage medium storing a program for executing the method according to claim 10.

16. The apparatus according to claim 1, wherein the controller calculates the driving scores for each of the at least two lanes of the road by summing all the driving lane scores imparted to the each of the at least two lanes of the road by the first, second, third, and fourth driving lane score impartations.

* * * * *